United States Patent
Hayafuji et al.

(10) Patent No.: US 9,979,419 B2
(45) Date of Patent: May 22, 2018

(54) FRONT-END CIRCUIT

(71) Applicant: Murata Manufacturing Co., Ltd., Kyoto (JP)

(72) Inventors: Hisao Hayafuji, Kyoto (JP); Hidenori Obiya, Kyoto (JP); Shinya Mizoguchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 180 days.

(21) Appl. No.: 14/993,463

(22) Filed: Jan. 12, 2016

(65) Prior Publication Data

US 2016/0126982 A1 May 5, 2016

Related U.S. Application Data

(63) Continuation of application No. PCT/JP2014/065530, filed on Jun. 12, 2014.

(30) Foreign Application Priority Data

Jul. 16, 2013 (JP) ................................ 2013-147380

(51) Int. Cl.
*H04W 4/00* (2018.01)
*H04B 1/00* (2006.01)
(Continued)

(52) U.S. Cl.
CPC ......... *H04B 1/0057* (2013.01); *H04B 1/0458* (2013.01); *H04B 1/0483* (2013.01); *H04B 1/18* (2013.01)

(58) Field of Classification Search
None
See application file for complete search history.

(56) References Cited

U.S. PATENT DOCUMENTS 5,374,929 A * 12/1994 Sakata ................ H03M 1/66
341/150
6,683,513 B2 * 1/2004 Shamsaifar ............ H01P 1/213
333/135
(Continued)

FOREIGN PATENT DOCUMENTS

CN 1336731 A 2/2001
CN 1965475 A 5/2007
(Continued)

OTHER PUBLICATIONS

Office action issued in Chinese Patent Application No. 201480040482.1 dated Nov. 4, 2016.
(Continued)

*Primary Examiner* — Lonnie Sweet
(74) *Attorney, Agent, or Firm* — Pearne & Gordon LLP

(57) ABSTRACT

A front-end circuit includes a multiplexer, a circulator, reception ports, and variable filters. A port in the multiplexer is connected to an antenna. A port in the circulator is connected to a port in the multiplexer. The reception ports are connected to a port in the circulator with the variable filters interposed therebetween. The multiplexer outputs a communication signal having a frequency in a low band to the port and outputs a communication signal having a frequency in a middle band to a port. Each of the low band and the middle band includes a plurality of frequency bands. The middle band is a range of frequencies higher than those in the low band and does not overlap the low band.

15 Claims, 4 Drawing Sheets

(51) Int. Cl.
*H04B 1/04* (2006.01)
*H04B 1/18* (2006.01)

(56) References Cited

U.S. PATENT DOCUMENTS

| | | |
|---|---|---|
| 2002/0032038 A1 | 3/2002 | Furutani et al. |
| 2003/0022631 A1* | 1/2003 | Rhodes .................... H04B 1/48 |
| | | 455/78 |
| 2007/0161357 A1 | 7/2007 | Tudosoiu et al. |
| 2007/0161358 A1 | 7/2007 | Bogdan |
| 2008/0238569 A1 | 10/2008 | Matsuo |
| 2010/0105425 A1* | 4/2010 | Asokan .................. H04B 1/406 |
| | | 455/552.1 |
| 2011/0117862 A1* | 5/2011 | Bagger ................ H04B 1/0057 |
| | | 455/77 |
| 2011/0159823 A1 | 6/2011 | Lo et al. |
| 2011/0312293 A1* | 12/2011 | Takayama .......... H03H 17/0294 |
| | | 455/296 |
| 2014/0038531 A1 | 2/2014 | Hayafuji |
| 2014/0169422 A1 | 6/2014 | Hayafuji |

FOREIGN PATENT DOCUMENTS

| | | |
|---|---|---|
| CN | 102111174 A | 6/2011 |
| CN | 102404882 A | 4/2012 |
| EP | 1164719 A1 | 12/2001 |
| JP | 2009-523340 A | 6/2009 |
| WO | 0150636 A1 | 12/2001 |
| WO | 2012140969 A1 | 10/2012 |
| WO | 2013027580 A1 | 2/2013 |

OTHER PUBLICATIONS

International Search Report for PCT/JP2014/065530 dated Jul. 8, 2014.
Translation of Written Opinion for PCT/JP2014/065530 dated Jul. 8, 2014.

* cited by examiner

FRONT-END CIRCUIT

BACKGROUND

Technical Field

The present disclosure relates to a front-end circuit disposed between an antenna and a transmission and reception circuit.

Nowadays, various kinds of front-end circuits supporting a plurality of frequency bands are commercially practical. Examples of such front-end circuits are disclosed in Patent Documents 1 and 2. The front-end circuit described in Patent Document 1 supports a plurality of frequency bands by providing isolation between signals having different frequencies by using a diplexer, switch, band pass filter, or other similar element.

The front-end circuit described in Patent Document 2 includes a plurality of antennas, switches, and a circulator. This front-end circuit achieves space diversity by switching a used antenna with a switch. This front-end circuit provides isolation between a transmission signal and a reception signal by using the circulator.

Patent Document 1: Japanese Unexamined Patent Application Publication (Translation of PCT Application) No. 2009-523340

Patent Document 2: International Publication No. 01/050636

BRIEF SUMMARY

The front-end circuit described in Patent Document 1 needs many switches and band pass filters to support a plurality of frequency bands. Thus there is a problem in that the front-end circuit is large. If the plurality of switch integrated circuits (Ics) are replaced with switch ICs each having a larger number of ports, the number of switch ICs used in the front-end circuit is reduced. In this case, however, the size of each of the switch ICs is increased, and thus the front-end circuit is also large.

In the case of carrier aggregation, in which either one or both of transmission and reception is performed simultaneously in a plurality of frequency bands, frequency bands in a low band (communication signal bands at or below 1 GHz) may be used as the plurality of frequency bands. However, when such carrier aggregation is performed in the front-end circuit described in Patent Document 1 or 2, the reception sensitivity may be degraded by transmission signals.

The present disclosure provides a front-end circuit having a reduced size and being capable of supporting carrier aggregation.

(1) A front-end circuit according to the present disclosure includes a first multiplexer, a circulator, a first reception port, a second reception port, a first transmission port, and first to third variable filters. As used herein, the term multiplex means the combination of signals, division of signals (as with demultiplexing) and the simultaneous transmission of signals in opposite directions (as with duplexing). The first multiplexer includes a first shared port, a first individual port, and a second individual port. The first shared port is connected to an antenna. The circulator includes a first port, a second port, and a third port. The first port is connected to the first individual port. The first reception port and the second reception port are connected to the second port. The first transmission port is connected to the third port. The first variable filter is connected between the second port and the first reception port. The second variable filter is connected between the second port and the second reception port. The third variable filter is connected between the third port and the first transmission port.

The first multiplexer outputs a communication signal having a frequency within a first communication signal range to the first individual port and outputs a communication signal having a frequency within a second communication signal range to the second individual port, the communication signals being input through the first shared port. Each of the first communication signal range and the second communication signal range includes a plurality of frequency bands. The second communication signal range is a range of frequencies higher than frequencies in the first communication signal range and does not overlap the first communication signal range. The circulator outputs a communication signal input through the first port to the second port and outputs a communication signal input through the third port to the first port.

In this configuration, the circuitry supporting the first communication signal range is achieved by using the circulator and the variable filters. Thus a switch IC is not used in the circuitry supporting the first communication signal range, and this can lead to a reduction in the size of the front-end circuit. In this configuration, a reception signal in a frequency band within the first communication signal range is sent to the first reception port or the second reception port in accordance with that frequency band. This can enable carrier aggregation using a plurality of frequency bands in the first communication signal range.

(2) The front-end circuit according to the present disclosure may further include a first filter connected between the first individual port and the first port.

In this configuration, a harmonic component of a transmission signal input through the first transmission port is removed by the first filter and the first multiplexer. This can suppress leakage of this harmonic component to the reception port corresponding to the second communication signal range. Therefore, carrier aggregation using a frequency band in the first communication signal range and a frequency band in the second communication signal range can be performed reliably.

(3) The front-end circuit according to the present disclosure may further include a variable matching circuit connected between the antenna and the first shared port.

In this configuration, the antenna side and the front-end circuit side can be matched in a plurality of frequency bands without necessarily the use of a plurality of antennas.

(4) The front-end circuit according to the present disclosure may be configured as described below. The front-end circuit further includes a second multiplexer connected between the second port and each of the first reception port and the second reception port. The first variable filter is connected between the second multiplexer and the first reception port. The second variable filter is connected between the second multiplexer and the second reception port. The second multiplexer outputs a communication signal input through the second port to the first reception port or the second reception port in accordance with a frequency of the communication signal.

In this configuration, reception signals in frequency bands within the first communication signal range are separated by the second multiplexer in accordance with the frequency bands. This can enable each of the reception signals to be reliably sent to the first reception port or the second reception port in accordance with the frequency band. Thus carrier aggregation using a plurality of frequency bands in the first communication signal range can be performed reliably.

(5) The front-end circuit according to the present disclosure may be configured as described below. The front-end circuit further includes a switch IC, a second transmission port, and a third transmission port. The switch IC includes a second shared port and a plurality of selectable ports. The second shared port is connected to the second individual port. The second transmission port and the third reception port are connected to the selectable ports.

(6) The front-end circuit according to the present disclosure may be configured as described below. The front-end circuit further includes a third multiplexer, a third transmission port, and a fourth reception port. The third multiplexer is connected to the second individual port. The third transmission port and the fourth reception port are connected to the third multiplexer. Each of the third transmission port and the fourth reception port supports a communication signal having a frequency within a third communication signal range. The third communication signal range is a range of frequencies higher than frequencies in the second communication signal range and does not overlap the second communication signal range.

(7) The front-end circuit may further include a second filter connected between the second individual port and the third multiplexer.

In this configuration, if a transmission signal input through the first transmission port leaks toward the second individual port, the leaked transmission signal is removed by the second filter. Thus this transmission signal can be prevented from leaking to the fourth reception port. The transmission signal input through the second transmission port can be prevented from leaking to the fourth reception port.

According to the present disclosure, the front-end circuit can have a reduced size. The front-end circuit can perform carrier aggregation using a plurality of frequency bands in a low band.

DETAILED DESCRIPTION

<<First Embodiment>>

Figure 1:
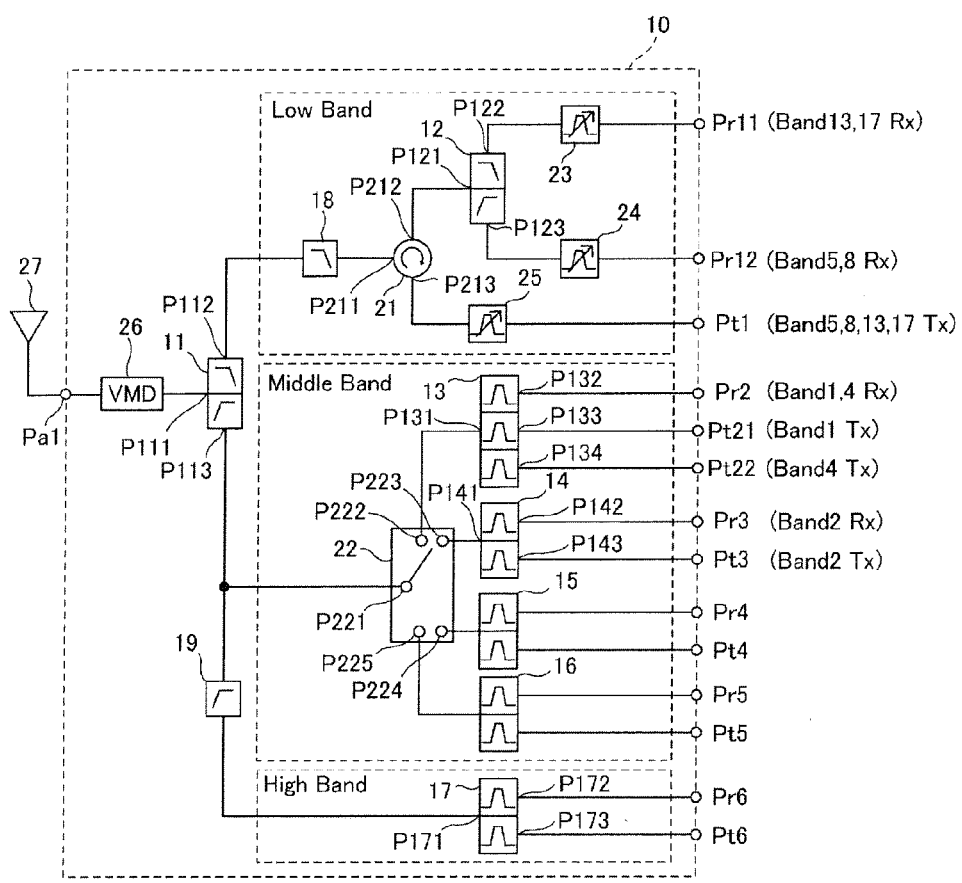
FIG. 1 is a block diagram that illustrates a front-end circuit 10 according to a first embodiment.

A front-end circuit according to a first embodiment of the present disclosure is described. FIG. 1 is a block diagram that illustrates a front-end circuit 10 according to the first embodiment. The front-end circuit 10 includes an antenna port Pa1, transmission ports Pt1, Pt21, Pt22, and Pt3 to Pt6, and reception ports Pr11, Pr12, and Pr2 to Pr6. The antenna port Pa1 is connected to an antenna 27. The transmission ports Pt1, Pt21, Pt22, and Pt3 to Pt6 are connected to a transmission circuit (not illustrated). The reception ports Pr11, Pr12, and Pr2 to Pr6 are connected to a reception circuit (not illustrated).

The transmission port Pt1 corresponds to a first transmission port in the present disclosure. The transmission ports Pt21, Pt22, and Pt3 to Pt5 correspond to a second transmission port in the present disclosure. The transmission port Pt6 corresponds to a third transmission port in the present disclosure. The reception port Pr11 corresponds to a first reception port in the present disclosure. The reception port Pr12 corresponds to a second reception port in the present disclosure. The reception ports Pr2 to Pr5 correspond to a third reception port in the present disclosure. The reception port Pr6 corresponds to a fourth reception port in the present disclosure.

The transmission port Pt1 and reception ports Pr11 and Pr12 support communication signals in a low band. The transmission ports Pt21, Pt22, and Pt3 to Pt5 and reception ports Pr2 to Pr5 support communication signals in a middle band. The transmission port Pt6 and reception port Pr6 support communication signals in a high band.

Each of the low band, middle band, and high band includes a plurality of frequency bands. The frequency bands included in the low band, middle band, and high band are positioned in this order from a lower frequency side and do not overlap one another. For example, the low band may be a communication signal range at or below 1 GHz, the middle band may be a communication signal range between 1.7 GHz and 2.2 GHz, and the high band may be a communication signal range at or above 2.5 GHz. The low band corresponds to a first communication signal range in the present disclosure. The middle band corresponds to a second communication signal range in the present disclosure. The high band corresponds to a third communication signal range in the present disclosure.

Each of the transmission ports and reception ports supports transmission and reception signals in frequency bands in the communication standard Long-Term Evolution (LTE). The transmission port Pt1 supports transmission signals in bands 5, 8, 13, and 17, the reception port Pr11 supports reception signals in the bands 13 and 17, and the reception port Pr12 supports reception signals in the bands 5 and 8. The transmission port Pt21 supports transmission signals in a band 1, the transmission port Pt22 supports transmission signals in a band 4, and the reception port Pr2 supports reception signals in the bands 1 and 4. The transmission port Pt3 supports transmission signals in a band 2, and the reception port Pr3 supports reception signals in the band 2.

Typically, in simultaneous reception by carrier aggregation using two or more frequency bands included in the low band, a frequency band included in a frequency range at or below 821 MHz and a frequency band included in a frequency range at or above 851 MHz and below 1 GHz are used in many cases. Thus, as described above, it may be that the frequency band whose reception range is included in the frequency range at or below 821 MHz be assigned to the reception port Pr11 and the frequency band whose reception range is included in the frequency range at or above 851 MHz and below 1 GHz be assigned to the reception port Pr12.

The correspondence between each of the transmission ports and reception ports and the bands in LTE is not limited to the above-described example. The transmission ports and reception ports may not comply with the LTE, and they are merely required to support any frequency bands in which transmission range and reception range are defined.

The front-end circuit 10 includes multiplexers 11 to 17, a low pass filter 18, a high pass filter 19, a circulator 21, a switch IC 22, variable filters 23 to 25, and a variable matching device (VMD) 26. The multiplexer 11 corresponds to a first multiplexer in the present disclosure. The multiplexer 12 corresponds to a second multiplexer in the present disclosure. The multiplexer 17 corresponds to a third multiplexer in the present disclosure. The low pass filter 18 corresponds to a first filter in the present disclosure. The high pass filter 19 corresponds to a second filter in the present disclosure. The variable filter 23 corresponds to a first variable filter in the present disclosure. The variable filter 24 corresponds to a second variable filter in the present disclosure. The variable filter 25 corresponds to a third variable filter in the present disclosure. The variable matching device corresponds to a variable matching circuit in the present disclosure.

The multiplexer 11 includes ports P111 to P113. The multiplexer 12 includes ports P121 to P123. The multiplexer 13 includes ports P131 to P134. The multiplexer 14 includes ports P141 to P143. Each of the multiplexers 15 and 16 includes substantially the same ports as those in the multiplexer 14. The multiplexer 17 includes ports P171 to P173. The circulator 21 includes ports P211 to P213. The switch IC 22 includes ports P221 to P225.

The port P111 in the multiplexer 11 corresponds to a first shared port in the present disclosure. The port P112 in the multiplexer 11 corresponds to a first individual port in the present disclosure. The port P113 in the multiplexer 11 corresponds to a second individual port in the present disclosure. The port P211 in the circulator 21 corresponds to a first port in the present disclosure. The port P212 in the circulator 21 corresponds to a second port in the present disclosure. The port P213 in the circulator 21 corresponds to a third port in the present disclosure. The port P221 in the switch IC 22 corresponds to a second shared port in the present disclosure. The ports P222 to P225 in the switch IC 22 correspond to selectable ports in the present disclosure.

The port P111 in the multiplexer 11 is connected to the antenna port Pa1 with the variable matching device 26 interposed therebetween. The port P112 in the multiplexer 11 is connected to the port P211 in the circulator 21 with the low pass filter 18 interposed therebetween. The port P212 in the circulator 21 is connected to the port P121 in the multiplexer 12. The port P122 in the multiplexer 12 is connected to the reception port Pr11 with the variable filter 23 interposed therebetween. The port P123 in the multiplexer 12 is connected to the reception port Pr12 with the variable filter 24 interposed therebetween. The port P213 in the circulator 21 is connected to the transmission port Pt1 with the variable filter 25 interposed therebetween.

The port P113 in the multiplexer 11 is connected to the port P221 in the switch IC 22. The port P222 in the switch IC 22 is connected to the port P131 in the multiplexer 13. The port P132 in the multiplexer 13 is connected to the reception port Pr2. The port P133 in the multiplexer 13 is connected to the transmission port Pt21. The port P134 in the multiplexer 13 is connected to the transmission port Pt22.

The port P223 in the switch IC 22 is connected to the port P141 in the multiplexer 14. The port P142 in the multiplexer 14 is connected to the reception port Pr3. The port P143 in the multiplexer 14 is connected to the transmission port Pt3. Like this, the port P224 in the switch IC 22 is connected to the reception port Pr4 and transmission port Pt4 with the multiplexer 15 interposed therebetween. The port P225 in the switch IC 22 is connected to the reception port Pr5 and transmission port Pt5 with the multiplexer 16 interposed therebetween.

The port P113 in the multiplexer 11 is connected to the port P171 in the multiplexer 17 with the high pass filter 19 interposed therebetween. The port P172 in the multiplexer 17 is connected to the reception port Pr6. The port P173 in the multiplexer 17 is connected to the transmission port Pt6.

The port P111 in the multiplexer 11 is a shared port, is connected to the port P112 in the multiplexer 11 with a low pass filter interposed therebetween, and is connected to the port P113 in the multiplexer 11 with a high pass filter interposed therebetween. When a communication signal has a frequency within the low band, the multiplexer 11 outputs the communication signal input through the port P111 to the port P112. When the communication signal has a frequency within the middle band or high band, the multiplexer 11 outputs the communication signal input through the port P111 to the port P113. In this manner, the multiplexer 11 separates communication signals into low-band communication signals and middle-band or high-band communication signals. The low pass filter in the multiplexer 11 suppresses a harmonic component in a transmission signal input through the transmission port Pt1.

The port P121 in the multiplexer 12 is a shared port, is connected to the port P122 in the multiplexer 12 with a low pass filter interposed therebetween, and is connected to the port P123 in the multiplexer 12 with a high pass filter interposed therebetween. When a communication signal is in the reception range in the frequency band associated with the reception port Pr11, the multiplexer 12 outputs the communication signal input through the port P121 to the port P122. When the communication signal is in the reception range in the frequency band corresponding to the reception port Pr12, the multiplexer 12 outputs the communication signal input through the port P121 to the port P123.

The port P131 in the multiplexer 13 is a shared port and is connected to the ports P132 to P134 in the multiplexer 13 with three band pass filters interposed therebetween. The pass band of the band pass filter connected between the ports P131 and P132 is the reception range in the frequency band associated with the reception port Pr2. The pass band of the band pass filter connected between the ports P131 and P133 is the transmission range in the frequency band associated with the transmission port Pt21. The pass band of the band pass filter connected between the ports P131 and P134 is the transmission range in the frequency band associated with the transmission port Pt22.

The port P141 in the multiplexer 14 is a shared port and is connected to the ports P142 and P143 with two band pass filters interposed therebetween. The pass band of the band pass filter connected between the ports P141 and P142 is the reception range in the frequency band associated with the reception port Pr3. The pass band of the band pass filter connected between the ports P141 and P143 is the transmission range in the frequency band associated with the transmission port Pt3.

Each of the multiplexers 15 and 16 has substantially the same configuration as that of the multiplexer 14. The pass bands of the band pass filters included in the multiplexer 15 support the reception range associated with the reception port Pr4 and the transmission range associated with the transmission port Pt4. The pass bands of the band pass filters included in the multiplexer 16 support the reception range associated with the reception port Pr5 and the transmission range associated with the transmission port Pt5.

The multiplexer 17 has substantially the same configuration as that of the multiplexer 14. Specifically, the port P171 in the multiplexer 17 is a shared port and is connected to the ports P172 and P173 in the multiplexer 17 with two band pass filters interposed therebetween. The pass band of the band pass filter connected between the ports P171 and P172 is the reception range in the frequency band associated with the reception port Pr6. The pass band of the band pass filter connected between the ports P171 and P173 is the transmission range in the frequency band associated with the transmission port Pt6.

The low pass filter 18 suppresses a harmonic component of a transmission signal input through the transmission port Pt1, as in the case of the low pass filter included in the multiplexer 11. By the use of the low pass filter included in the multiplexer 11 and the low pass filter 18, the harmonic component of the transmission signal can be removed sufficiently.

When a transmission signal input through the transmission port Pt1 leaks toward the port P113 in the multiplexer 11, the high pass filter 19 removes the leaked transmission signal. This can prevent this transmission signal from leaking to the reception port Pr6 on the high band side. The high pass filter 19 prevents transmission signals input through the transmission ports Pt3 to Pt5 from leaking to the reception port Pr6 on the high band side. When reception signals are output through the port P113 in the multiplexer 11, the high pass filter 19 separates them into a reception signal having a frequency within the middle band and a reception signal having a frequency within the high band.

A communication signal input through the port P211 in the circulator 21 is output to the port P212 in the circulator 21. A communication signal input through the port P213 in the circulator 21 is output to the port P211 in the circulator 21. In this manner, the reception signal and transmission signal can be propagated in predetermined directions. The circulator 21 enables communication signals in a wide range of frequencies including a plurality of frequency bands to be propagated with low losses.

The port P221 in the switch IC 22 is connected to any one of the ports P222 to P225 in the switch IC 22 in accordance with the frequency band used in communication. For example, when the band 1 or 4 is used in communication, the port P221 is connected to the port P222. When the band 2 is used in communication, the port P221 is connected to the port P223.

Each of the variable filters 23 to 25 changes the communication range in accordance with the frequency band used in communication. For example, when the band 13 is used in reception, the variable filter 23 causes a communication signal in the reception range in the band 13 to pass therethrough. When the band 17 is used in reception, the variable filter 23 causes a communication signal in the reception range in the band 17 to pass therethrough. When the band 5 is used in reception, the variable filter 24 causes a communication signal in the reception range in the band 5 to pass therethrough. When the band 8 is used in reception, the variable filter 24 causes a communication signal in the reception range in the band 8 to pass therethrough. When the band 13 is used in transmission, the variable filter 25 causes a communication signal in the transmission range in the band 13 to pass therethrough. When the band 17 is used in transmission, the variable filter 23 causes a communication signal in the transmission range in the band 17 to pass therethrough. In this manner, a plurality of frequency bands can be assigned to a single reception port or transmission port.

The variable matching device 26 adjusts matching between the antenna 27 side and the front-end circuit 10 side in accordance with the frequency band used in communication. This can enable matching between the antenna 27 side and the front-end circuit 10 side in a plurality of frequency bands without necessarily using a plurality of antennas.

Figure 2:
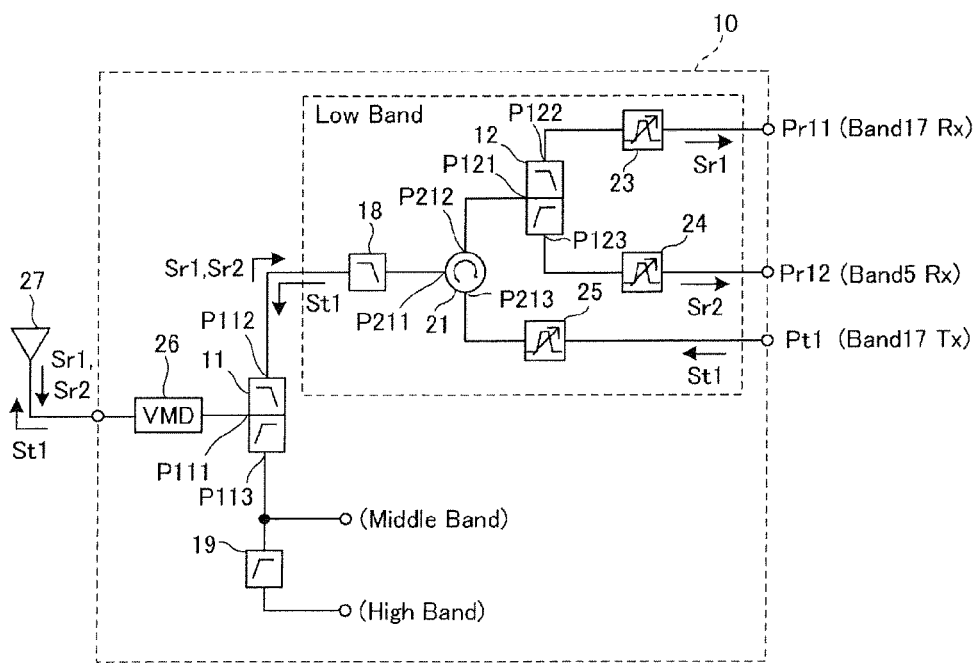
FIG. 2 is a block diagram that illustrates a first example of propagation of communication signals in the front-end circuit 10.

FIG. 2 is a block diagram that illustrates a first example of propagation of communication signals in the front-end circuit 10. FIG. 2 illustrates propagation of communication signals in the case where carrier aggregation using the band 17 in transmission, the bands 5 and 17, that is, two frequency bands in the low band, in reception is performed.

When a signal in the band 17 is received at the antenna 27, that signal is sent as a reception signal Sr1 to the port P111 in the multiplexer 11. Because the reception signal Sr1 has a frequency within the low band, the multiplexer 11 outputs the reception signal Sr1 input through the port P111 to the port P112. The reception signal Sr1 output from the multiplexer 11 is sent to the port P211 in the circulator 21. The circulator 21 outputs the reception signal Sr1 input through the port P211 to the port P212. The reception signal Sr1 output from the circulator 21 is sent to the port P121 in the multiplexer 12. Because the reception signal Sr1 is in the reception range in the band 17, the multiplexer 12 outputs the reception signal Sr1 input through the port P121 to the port P122. The reception signal Sr1 output from the multiplexer 12 is sent to the variable filter 23.

Because the band 17 is used in reception, the variable filter 23 causes the signal in the reception range in the band 17 to pass therethrough. As described above, the reception signal Sr1 is in the reception range in the band 17. Thus the reception signal Sr1 passes through the variable filter 23 and reaches the reception port Pr11.

When a signal in the band 5 is received at the antenna 27, that signal is sent as a reception signal Sr2 to the port P121 in the multiplexer 12, as in the case of the reception signal Sr1. Because the reception signal Sr2 is in the reception range in the band 5, which is a range of frequencies higher than those in the band corresponding to the reception signal Sr1, the multiplexer 12 outputs the reception signal Sr2 input through the port P121 to the port P123. The reception signal Sr2 output from the multiplexer 12 is sent to the variable filter 24. Because the band 5 is used in reception, the variable filter 24 causes the signal in the reception range in the band 5 to pass therethrough. Thus the reception signal Sr2 passes through the variable filter 24 and reaches the reception port Pr12.

In this way, when signals in the bands 5 and 17 are simultaneously received, the reception signals can be output to the corresponding reception ports Pr11 and Pr12, respectively.

When a transmission signal St1 in the band 17 is input through the transmission port Pt1, the transmission signal St1 is sent to the variable filter 25. Because the band 17 is used in transmission, the variable filter 25 causes the signal in the transmission range in the band 17 to pass therethrough. Thus the variable filter 25 causes the transmission signal St1 to pass therethrough and suppresses a harmonic component of the transmission signal St1. The transmission signal St1 having passed through the variable filter 25 is sent to the port P213 in the circulator 21. The circulator 21 outputs the transmission signal St1 input through the port P213 to the port P211. At the same time, the circulator 21 prevents the transmission signal St1 from leaking toward the reception ports Pr11 and Pr12. The transmission signal St1 output from the circulator 21 passes through the low pass filter 18 and the low pass filter in the multiplexer 11 and is propagated to the antenna 27. The antenna 27 ejects the transmission signal St1 into space.

Figure 3:
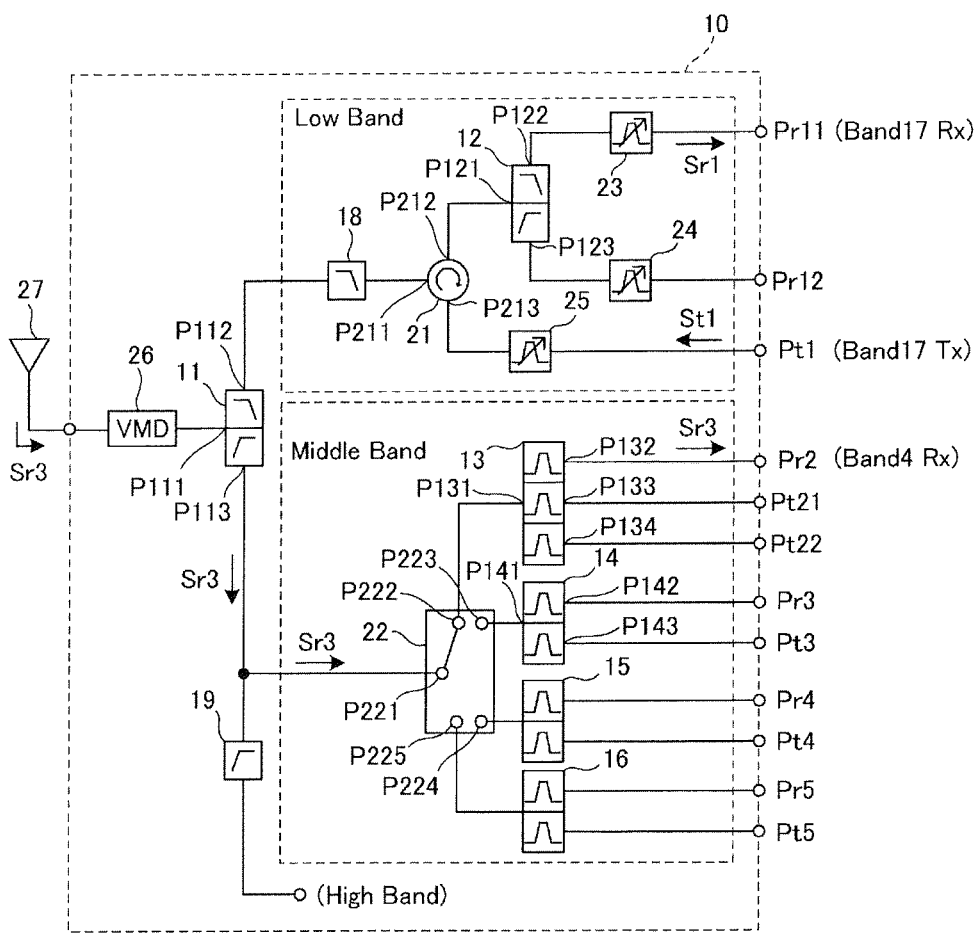
FIG. 3 is a block diagram that illustrates a second example of propagation of communication signals in the front-end circuit 10.

FIG. 3 is a block diagram that illustrates a second example of propagation of communication signals in the front-end circuit 10. FIG. 3 illustrates propagation of communication signals in the case where carrier aggregation using the band 17 in transmission, the bands 4 and 17, that is, a frequency band in the middle band and a frequency band in the low band, in reception is performed.

When a signal in the band 4 is received at the antenna 27, that signal is sent as a reception signal Sr3 to the port P111 in the multiplexer 11. Because the reception signal Sr3 has a frequency within the middle band, the multiplexer 11 outputs the reception signal Sr3 input through the port P111 to the port P113. The reception signal Sr3 output from the multiplexer 11 is sent to the port P221 in the switch IC 22. The reception signal Sr3 in the band 4 cannot pass through the high pass filter 19 and thus is not propagated to high-band circuitry.

Because the band 4 is used in reception, the port P221 in the switch IC 22 is connected to the port P222. Thus the switch IC 22 outputs the reception signal Sr3 input through the port P221 to the port P222. The reception signal Sr3 output from the switch IC 22 is sent to the multiplexer 13. Because the reception signal Sr3 is in the reception range in the band 4, the multiplexer 13 outputs the reception signal Sr3 input through the port P131 to the port P132. The reception signal Sr3 output from the multiplexer 13 is sent to the reception port Pr2.

The reception signal Sr1 in the band 17 received at the antenna 27 is sent to the reception port Pr11, as in the above-described case.

In this way, when signals in the bands 4 and 17 are simultaneously received, the reception signals can be output to the corresponding reception ports Pr11 and Pr2, respectively.

When the transmission signal St1 in the band 17 is input through the transmission port Pt1, the transmission signal St1 is sent to the antenna 27, as in the above-described case. At this time, because a triple-frequency wave of the transmission signal St1 has a frequency within the reception range in the band 4, if this triple-frequency wave leaks to the reception port Pr2, the reception characteristics in the band 4 may significantly degrade. A high frequency component (e.g., triple-frequency wave) of the transmission signal St1 is suppressed by the low pass filter 18 and then further suppressed by the low pass filter in the multiplexer 11. Thus the harmonic component of the transmission signal St1 can be sufficiently removed by the two low pass filters. Accordingly, leakage of this harmonic component to the reception port Pr2, and thus degradation in the reception characteristics in the band 4 can be suppressed.

In this way, in the first embodiment, carrier aggregation using two frequency bands in the low band can be performed. In addition, carrier aggregation using a frequency band in the low band and a frequency band in the middle band can also be performed. Degradation in the reception characteristics in performing carrier aggregation can be suppressed.

The frequency bands used in communication are not limited to the above-described examples. For example, carrier aggregation using the bands 4 and 17 in transmission may be performed. Communication using frequency bands in the high band may be performed. Communication using only a single frequency band without necessarily carrier aggregation may also be performed. In such cases, communication signals are propagated in the front-end circuit 10 in substantially the same way as in the above-described case.

If the low-band circuitry is achieved by using a switch IC and filters, the size of the front-end circuit is large. In contrast, in the first embodiment, the low-band circuitry is achieved by using the circulator 21 and variable filters 23 to 25. Thus, in the first embodiment, the switch IC can be omitted in the low-band circuitry, and the size of the front-end circuit can be reduced. The middle-band circuitry may also be achieved by using a circulator and variable filters.

<<Second Embodiment>>

Figure 4:
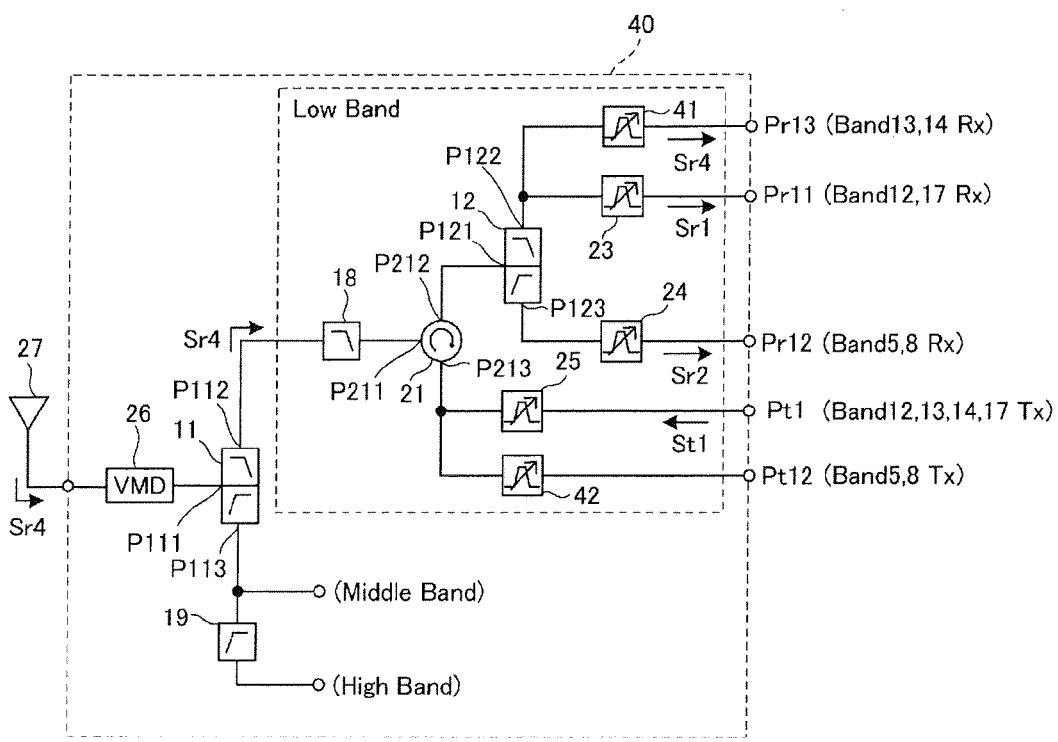
FIG. 4 is a block diagram that illustrates part of a front-end circuit 40 according to a second embodiment.

A front-end circuit according to a second embodiment of the present disclosure is described. FIG. 4 is a block diagram that illustrates part of a front-end circuit 40 according to the second embodiment. The front-end circuit 40 includes variable filters 41 and 42, a transmission port Pt12, and a reception port Pr13, in addition to the elements in the front-end circuit 10 according to the first embodiment.

The transmission port Pt12 is connected to the port P213 in the circulator 21 with the variable filter 42 interposed therebetween. The reception port Pr13 is connected to the port P122 in the multiplexer 12 with the variable filter 41 interposed therebetween. The other configuration according to the second embodiment is substantially the same as that according to the first embodiment.

The transmission ports and reception ports support transmission and reception signals in frequency bands in LTE. The reception port Pr11 supports reception signals in the bands 12 and 17, the reception port Pr12 supports reception signals in the bands 5 and 8, and the reception port Pr13 supports reception signals in the bands 13 and 14. The transmission port Pt1 supports transmission signals in the bands 12, 13, 14, and 17, and the transmission port Pt12 supports transmission signals in the bands 5 and 8. The correspondence between each of the transmission ports and reception ports and the bands in LTE is not limited to the above-described example.

Next, propagation of communication signals in the front-end circuit 40 is described. FIG. 4 illustrates propagation of communication signals in the case where carrier aggregation using the band 17 in transmission and the bands 5, 13, and 17, that is, three frequency bands in the low band, in reception is performed.

A reception signal Sr4 in the band 13 received at the antenna 27 passes through the multiplexer 11 and the circulator 21 and is propagated to the port P121 in the multiplexer 12, as in the case of the first embodiment. The multiplexer 12 outputs the reception signal Sr4 input through the port P121 to the port P122. The reception signal Sr4 output from the multiplexer 12 is sent to the variable filters 23 and 41.

Because the bands 13 and 17 are used in reception, the variable filter 23 causes the signal in the reception range in the band 17 to pass therethrough, and the variable filter 41 causes the signal in the reception range in the band 13 to pass therethrough. As described above, the reception signal Sr4 is in the reception range in the band 13. Thus the reception signal Sr4 cannot pass through the variable filter 23, but can pass through the variable filter 41. Accordingly, the reception signal Sr4 reaches the reception port Pr13.

The reception signal Sr1 in the band 17 received at the antenna 27 is sent to the reception port Pr11, as in the above-described case. The reception signal Sr2 in the band 5 received at the antenna 27 is sent to the reception port Pr12, as in the above-described case. When the transmission signal St1 in the band 17 is input through the transmission port Pt1, it is sent to the antenna 27, as in the above-described case.

In this way, in the second embodiment, carrier aggregation with simultaneous reception using three frequency bands in the low band can be performed. The frequency bands used in communication are not limited to the above-described examples. For example, carrier aggregation with simultaneous transmission using the bands 5 and 17 in the low band may be performed.

The second embodiment can provide substantially the same advantages as in the first embodiment.

REFERENCE SIGNS LIST

P111 port (first shared port)
P112 port (first individual port)
P113 port (second individual port)
P211 port (first port)
P212 port (second port)
P213 port (third port)
P221 port (second shared port)
P222 to P225 port (selectable port)
P121 to P123, P131 to P134, P141 to P143, P171 to P173 port
Pa1 antenna port
Pr11 reception port (first reception port)
Pr12 reception port (second reception port)
Pr2 to Pr5 reception port (third reception port)
Pr6 reception port (fourth reception port)
Pr13 reception port
Pt1 transmission port (first transmission port)
Pt21, Pt22, Pt3 to Pt5 transmission port (second transmission port)
Pt6 transmission port (third transmission port)
Pt12 transmission port
Sr1 to Sr4 reception signal
St1 transmission signal
10, 40 front-end circuit
11 multiplexer (first multiplexer)
12 multiplexer (second multiplexer)
17 multiplexer (third multiplexer)
13 to 16 multiplexer
18 low pass filter (first filter)
19 high pass filter (second filter)
21 circulator
22 switch IC
23 variable filter (first variable filter)
24 variable filter (second variable filter)
25 variable filter (third variable filter)
41, 42 variable filter
26 variable matching device (variable matching circuit)
27 antenna

The invention claimed is:

1. A front-end circuit comprising:
a first multiplexer including a first shared port, a first individual port, and a second individual port, the first shared port being connected to an antenna;
a circulator including a first port, a second port, and a third port, the first port being connected to the first individual port;
a first reception port and a second reception port respectively connected to the second port;
a first transmission port connected to the third port;
a first variable filter connected between the second port and the first reception port;
a second variable filter connected between the second port and the second reception port;
a third variable filter connected between the third port and the first transmission port; and
a second multiplexer connected between the second port and each of the first reception port and the second reception port,
wherein the first multiplexer outputs a communication signal having a frequency within a first communication signal range to the first individual port and the first multiplexer outputs a communication signal having a frequency within a second communication signal range to the second individual port, the communication signals being input through the first shared port,
each of the first communication signal range and the second communication signal range includes a plurality of frequency bands,
the second communication signal range is a range of frequencies higher than frequencies in the first communication signal range and does not overlap the first communication signal range,
the circulator outputs a communication signal input through the first port to the second port and the circulator outputs a communication signal input through the third port to the first port, and wherein:
the first variable filter is connected between the second multiplexer and the first reception port,
the second variable filter is connected between the second multiplexer and the second reception port, and
the second multiplexer outputs a communication signal input through the second port to the first reception port or the second reception port in accordance with a frequency of the communication signal.

2. The front-end circuit according to claim 1, further comprising a first filter connected between the first individual port and the first port.

3. The front-end circuit according to claim 2, further comprising a variable matching circuit connected between the antenna and the first shared port.

4. The front-end circuit according to claim 2, further comprising:
a switch IC including a second shared port and a plurality of selectable ports, the second shared port being connected to the second individual port; and
a second transmission port and a third reception port connected to the selectable ports respectively.

5. The front-end circuit according to claim 2, further comprising:
a third multiplexer connected to the second individual port; and
a third transmission port and a fourth reception port connected to the third multiplexer respectively,
wherein each of the third transmission port and the fourth reception port supports a communication signal having a frequency within a third communication signal range, and
the third communication signal range is a range of frequencies higher than frequencies in the second communication signal range and does not overlap the second communication signal range.

6. The front-end circuit according to claim 1, further comprising a variable matching circuit connected between the antenna and the first shared port.

7. The front-end circuit according to claim 6, further comprising:

a switch IC including a second shared port and a plurality of selectable ports, the second shared port being connected to the second individual port; and
a second transmission port and a third reception port connected to the selectable ports respectively.

8. The front-end circuit according to claim 6, further comprising:
a third multiplexer connected to the second individual port; and
a third transmission port and a fourth reception port connected to the third multiplexer respectively,
wherein each of the third transmission port and the fourth reception port supports a communication signal having a frequency within a third communication signal range, and
the third communication signal range is a range of frequencies higher than frequencies in the second communication signal range and does not overlap the second communication signal range.

9. The front-end circuit according to claim 1, further comprising:
a switch integrated circuit (IC) including a second shared port and a plurality of selectable ports, the second shared port being connected to the second individual port; and
a second transmission port and a third reception port respectively connected to the selectable ports.

10. The front-end circuit according to claim 9, further comprising:
a third multiplexer connected to the second individual port; and
a third transmission port and a fourth reception port connected to the third multiplexer respectively,
wherein each of the third transmission port and the fourth reception port supports a communication signal having a frequency within a third communication signal range, and
the third communication signal range is a range of frequencies higher than frequencies in the second communication signal range and does not overlap the second communication signal range.

11. The front-end circuit according to claim 1, further comprising:
a third multiplexer connected to the second individual port; and
a third transmission port and a fourth reception port respectively connected to the third multiplexer,
wherein each of the third transmission port and the fourth reception port supports a communication signal having a frequency within a third communication signal range, and
the third communication signal range is a range of frequencies higher than frequencies in the second communication signal range and does not overlap the second communication signal range.

12. The front-end circuit according to claim 11, further comprising a second filter connected between the second individual port and the third multiplexer.

13. The front-end circuit according to claim 1, further comprising:
a switch IC including a second shared port and a plurality of selectable ports, the second shared port being connected to the second individual port; and
a second transmission port and a third reception port connected to the selectable ports respectively.

14. The front-end circuit according to claim 1, further comprising a fourth variable filter connected between third port and fourth transmission port.

15. The front-end circuit according to claim 1, further comprising a fifth variable filter connected between the second multiplexer and a fifth reception port.

* * * * *